United States Patent
Matsui et al.

(10) Patent No.: US 7,258,133 B2
(45) Date of Patent: Aug. 21, 2007

(54) PRESSURE REDUCING VALVE

(75) Inventors: Hideyuki Matsui, Kitakyushu (JP);
Osamu Tokunaga, Kitakyushu (JP);
Yoshika Hirai, Kitakyushu (JP)

(73) Assignee: ToTo Ltd., Kitakyushu-shi (JP)

( * ) Notice: Subject to any disclaimer, the term of this patent is extended or adjusted under 35 U.S.C. 154(b) by 274 days.

(21) Appl. No.: 10/506,162

(22) PCT Filed: Mar. 7, 2003

(86) PCT No.: PCT/JP03/02711

§ 371 (c)(1),
(2), (4) Date: Feb. 3, 2005

(87) PCT Pub. No.: WO03/075110

PCT Pub. Date: Sep. 12, 2003

(65) Prior Publication Data

US 2005/0126636 A1    Jun. 16, 2005

(30) Foreign Application Priority Data

Mar. 7, 2002 (JP) .............................. 2002-062310

(51) Int. Cl.
*G05D 16/02* (2006.01)
(52) U.S. Cl. .................. 137/505.18; 137/508; 137/906
(58) Field of Classification Search ................ 137/505, 137/505.18, 508, 906
See application file for complete search history.

(56) References Cited

U.S. PATENT DOCUMENTS

| | | | | | |
|---|---|---|---|---|---|
| 2,888,033 A | * | 5/1959 | Eickmeyer | .................. | 137/505 |
| 4,474,207 A | * | 10/1984 | Rosenberg | .................. | 137/505 |
| 4,915,127 A | * | 4/1990 | Werley | .................. | 137/505.42 |
| 5,033,505 A | * | 7/1991 | Eidsmore | ............... | 137/505.39 |
| 5,396,918 A | * | 3/1995 | Parker | .......................... | 137/14 |
| 6,131,607 A | * | 10/2000 | Cooke | ........................ | 137/508 |

FOREIGN PATENT DOCUMENTS

| | | |
|---|---|---|
| JP | 62-62065 A | 3/1987 |
| JP | 7-302123 | 11/1995 |
| JP | 11-345029 A | 12/1999 |
| JP | 2000-320723 | 11/2000 |

OTHER PUBLICATIONS

International Search Report, completed Jun. 9, 2003.

* cited by examiner

*Primary Examiner*—Stephen M. Hepperle
(74) *Attorney, Agent, or Firm*—Griffin & Szipl, P.C.

(57) ABSTRACT

A pressure reducing valve comprises a valve support member provided with a water passage, a valve seat fitting on the portion of the valve support member primary side relative to the secondary side end of the water passage, a cup-shaped valve body fitting on the secondary side end of the valve support member to slide and capable of abutting the valve seat at the open end, while enclosing the secondary side end of the water passage at the cylindrical portion, a seal member for sealing the sliding contact part between the valve support member and the valve body, and a resilient member disposed in the valve body to force the valve body away from the valve seat.

6 Claims, 12 Drawing Sheets

Primary side P

Secondary side P'

(a)　　　(b)

PRESSURE REDUCING VALVE

This is a National Phase Application in the United States of International Patent Application No. PCT/JP03/02711 filed Mar. 7, 2003, which claims priority on Japanese Patent Application No. 2002-062310, filed Mar. 7, 2002. The entire disclosures of the above patent applications are hereby incorporated by reference.

TECHNICAL FIELD

The present invention relates to a pressure reducing valve disposed in a pipe to control secondary pressure in the pipe (pressure at a portion downstream of the valve) to not larger than a predetermined level.

BACKGROUND ART

As shown in FIG. 1, Japanese Patent Laid-Open Publication No.302123/1995 discloses a pressure reducing valve α comprising a cylindrical casing 1, a valve support member 2 provided with a plate portion 2a, an annular portion 2b and a water passage 2c and fitting in an end of the casing 1, a valve seat 3 fitting on the valve support member 2, a cylindrical valve body 4 provided with an external flange 4b at its one end 4a, the external flange 4b fitting in the other end of the casing 1 to slide and the other end 4c being inserted in the annular portion 2b to slide, and a spring 6 disposed in a chamber 5 defined by the casing 1, the annular portion 2b, the external flange 4b and a cylindrical portion of the valve body 4 to force the external flange 4b away from the valve seat 3, wherein the pressure reducing valve is fitted in a city water pipe with the plate portion 2a directed toward the upstream side (hereinafter called the primary side). In the pressure reducing valve α, city water flows from the primary side to the downstream side (hereinafter called the secondary side) through the water passage 2c and an internal space of the valve body 4. When the water pressure in the secondary side city water pipe (hereinafter called the secondary pressure) increases due to the increase of the water pressure in the primary side city water pipe (hereinafter called the primary pressure), the valve body 4 moves to a position where the force applied to the external flange 4b by the secondary pressure balances with the force applied to the external flange 4b by the spring 6, the other end 4c of the valve body 4 approaches the valve seat 3, and the sectional area of the water passage 2c decreases. As a result, the secondary pressure is reduced to approach a predetermined level. When the primary pressure further increases, the other end 4c of the valve body 4 abuts the valve seat 3 to close the water passage 2c, thereby shutting off the water flow from the primary side to the secondary side. Thus, the secondary pressure is kept at the predetermined level.

As shown in FIG. 2, Japanese Patent Laid-Open Publication No. 320723/2000 discloses a pressure reducing valve β comprising a cylindrical casing 7, a valve support member 8 provided with a plate portion 8a, an annular portion 8b and a water passage 8c and fitting in an end of the casing 7, a valve seat 9 fitting in the valve support member 8, a cylindrical valve body 10 slightly spaced annularly from the other end of the casing 7 to slide at an external flange 10b provided at its portion near the one end 10a, and inserted in the annular portion 8b to slide at the other end 10c, and a spring 12 disposed in a chamber 11 defined by the casing 7, the annular portion 8b, the external flange 10b and a cylindrical portion of the valve body 10 to force the external flange 10b away from the valve seat 9, wherein the pressure reducing valve is fitted in a city water pipe with the plate portion 8a directed toward the primary side. In the pressure reducing valve β, city water flows from the primary side to secondary side through the water passage 8c and an internal space of the valve body 10. When the secondary pressure increases due to the increase of the primary pressure, the valve body 10 moves to a position where the force applied to the external flange 10b by the secondary pressure balances with the force applied to the external flange 10b by the spring 12, the other end 10c of the valve body 10 approaches the valve seat 9, and the sectional area of the water passage 8c decreases. As a result, the secondary pressure is reduced to approach a predetermined level. When the primary pressure further increases, the other end 10c of the valve body 10 abuts the valve seat 9 to close the water passage 8c, thereby shutting off the water flow from the primary side to the secondary side. Thus, the secondary pressure is kept at the predetermined level. The secondary pressure is applied to the external flange 10b through the narrow annular space between the one end 10a of the valve body 10 and the casing 7. Therefore, even if the secondary pressure increases quickly due to the closure of a closing valve disposed secondary side, the force applied to the external flange 10b by the secondary pressure does not increase quickly because of the pressure loss caused by the narrow annular space, and the water passage 8c is not closed quickly. Therefore, no water hammer is caused at the primary side due to the closure of a closing valve disposed at the secondary side.

DISCLOSURE OF INVENTION

The pressure reducing valves α and β have following disadvantages.

① Seal members 13, 14 disposed between the annular portions 2b, 8b and the casings 1, 7, seal members 15, 16 disposed between the annular portions 2b, 8b and the valve bodies 4, 10, and seal members 17, 18 disposed between the external flanges 4b, 10b and the casings 1, 7 are necessary to prevent water from penetrating into the chambers 5, 11 receiving the springs 6, 12. Therefore, production costs are high because a lot of seal members are necessary.

② When the primary pressure increases, the valve bodies 4, 10 approach the valve seats 3, 9 due to the increase of the secondary pressure to reduce the sectional area of the water passages 2c, 8c. On the other hand, when the primary pressure decreases, the valve bodies 4, 10 leave the valve seats 3, 9 due to the reduction of the secondary pressure. Resistance forces against the approaching movement and the leaving movement of the valve bodies 4, 10 relative to the valve seats 3, 9 are large. Therefore, when the primary pressure increases, the secondary pressure is controlled to a relatively high level, while the secondary pressure is controlled to a relatively low level when the primary pressure decreases. As a result, hysteresis is generated in the correlation diagram between the primary pressure and the secondary pressure, as shown in FIG. 3, to disturb the precise control of the secondary pressure.

③ Radial sizes of the pressure reducing valves are large because the chambers 5, 11 for receiving the springs 6, 12 are defined radially outside the valve bodies 4, 10. Therefore, it is hard to fit the pressure reducing valves in the city water pipes.

An object of the present invention is to provide a pressure reducing valve, which is low in production cost because it comprises only a small number of seal members, wherein the generation of hysteresis in the correlation diagram between the primary pressure and the secondary pressure is restrained, and which is easy to fit in a city water pipe due to its small radial size.

In accordance with the present invention, there is provided a pressure reducing valve comprising a valve support member provided with a water passage, a valve seat fitting on the portion of the valve support member primary side relative to the secondary side end of the water passage, a cup-shaped valve body fitting on the secondary side end of the valve support member to slide and capable of abutting the valve seat at the open end, while enclosing the secondary side end of the water passage at the cylindrical portion, a seal member for sealing the sliding contact part between the valve support member and the valve body, and a resilient member disposed in the valve body to force the valve body away from the valve seat.

In the pressure reducing valve of the present invention, city water flows from the primary side to the secondary side through the water passage formed in the valve support member and an annular water passage formed between a city water pipe receiving the pressure reducing valve and the circumferential wall of the valve body. When the secondary pressure increases due to the increase of the primary pressure, the valve body moves to a position where the force applied to the closed end of the valve body by the secondary pressure balances with the force applied to the valve body by the resilient member, and the open end of the valve body approaches the valve seat to partially cover the secondary side end of the water passage formed in the valve support member, thereby reducing the sectional area of the secondary side end of the water passage. As a result, the pressure loss in the water passage increases to reduce the secondary pressure, thereby making the secondary pressure approach a predetermined level. When the primary pressure further increase, the open end of the valve body abuts the valve seat, while the cylindrical portion of the valve body covers the secondary side end of the water passage formed in the valve support member, to close the water passage, thereby shutting off the water flow from the primary side to the secondary side. Thus, the secondary pressure is kept at the predetermined level.

In the pressure reducing valve of the present invention, the seal member disposed in the sliding contact part between the valve support member and the valve body can alone seal the chamber receiving the resilient member for forcing the valve body. Therefore, the production cost of the pressure reducing valve of the present invention is low because of the small number of seal members.

In the pressure reducing valve of the present invention, generation of the hysteresis in the correlation diagram between the primary pressure and the secondary pressure is restrained because the number of the seal members for sealing the space receiving the resilient member is small and resistance force against the approaching slide movement and the leaving slide movement of the valve body relative to the valve seat is small. As a result, precise control of the secondary pressure becomes possible.

In the pressure reducing valve of the present invention, the radial size of the valve is small and the valve is downsized because the space for receiving the resilient member to force the valve body is formed in the valve body. Therefore, the pressure reducing valve of the present invention can be easily fitted in a city water pipe. Even if the valve is downsized, the required flow rate can be maintained because an annual water passage is formed radially outside the valve.

In a preferred embodiment of the present invention, the resilient member is mass of air contained in the valve body.

In a preferred embodiment of the present invention, the resilient member is mass of inert gas contained in the valve body.

When mass of air or mass of inert gas contained in the valve body is used as the resilient member, the number of the members of the pressure reducing valve decreases and the assembling work of the pressure reducing valve becomes easy. Mass of inert gas contained in the valve body can work as a resilient member for a long time because it does not dissolve in the water. Inert gas protects the valve support member and the valve body against corrosion.

In a preferred embodiment of the present invention, the resilient member is a compressible member charged into the valve body.

When a compressible member charged into the valve body is used as the resilient member, the influence of the temperature of the water passing through the valve becomes less and the control of the secondary pressure becomes more precise than those when mass of gas contained in the valve body is used as the resilient member.

In a preferred embodiment of the present invention, the resilient member is a spring and a passage for communicating the internal space of the valve body with the atmosphere is formed in the valve support member.

A spring may be used as the resilient member. When the internal space of the valve body is communicated with the atmosphere, the spring alone applies a force to the valve body to move it away from the valve seat. Therefore, influence of the temperature of the water passing through the valve upon the force moving the valve body away from the valve seat decreases, and the control of the secondary pressure becomes precise.

In a preferred embodiment of the present invention, the valve seat can make a watertight abutment against the outer circumferential portion or the inner circumferential portion of the open end of the valve body.

When the secondary pressure reaches a predetermined level due to the increase of the primary pressure, the open end of the valve body abuts the valve seat, while the cylindrical portion of the valve body coverers the secondary side end of the water passage formed in the valve support member, to close the water passage formed in the valve support member, thereby shutting off the communication between the primary side and the secondary side of the city water pipe. Therefore, even if the primary pressure further increases, the secondary pressure is kept at the predetermined level. When the valve seat abuts the outer circumferential portion or the inner circumferential portion of the open end of the valve body, the valve body keeps moving, while keeping the shutoff of the communication between the primary side portion and the secondary side portion of the city water pipe, volume of the internal space of the secondary side portion of the city water pipe keeps increasing, and the pressure in the secondary side portion of the city water pipe keeps decreasing, even after the communication between the primary side portion and the secondary side portion of the city water pipe is shut off. Therefore, the level of the secondary pressure can become lower than that at the instant of the communication between the primary side portion and the secondary side portion of the city water pipe being shut off.

When the valve seat abuts the inner circumferential portion of the open end of the valve body, the primary pressure is no more applied on the end face of the open end of the valve body the instant that the communication between the primary side and the secondary side of the city water pipe is shut off. Thus, the secondary pressure for maintaining the shutoff of the communication can be reduced. Therefore, stress working on the secondary side city water pipe decreases, degree of freedom in the selection of material for the secondary side city water pipe increases, and degree of freedom in the selection of equipment connected to the secondary side city water pipe increases.

In a preferred embodiment of the present invention, the valve seat abuts the inner circumferential portion of the open end of the valve body and the portion of the valve seat abutting the open end of the valve body inclines radially outward in the direction away from the open end of the valve body.

When the portion of the valve seat abutting the open end of the valve body inclines radially outward in the direction away from the open end of the valve body, the inner circumferential edge of the open end of the valve body cuts into the valve seat when the open end of the valve body abuts the valve seat. Therefore, the primary pressure is reliably kept from acting on the end face of the open end of the valve body when the communication between the primary side and the secondary side of the city water pipe is shut off. Thus, the secondary pressure for maintaining the shutoff of the communication can be reliably reduced.

In a preferred embodiment of the present invention, the valve seat can make watertight abutment against the end face of the open end of the valve body.

When the secondary pressure reaches a predetermined level due to the increase of the primary pressure, the end face of the open end of the valve body abuts the valve seat, while the cylindrical portion of the valve body covers the secondary side end of the water passage formed in the valve support member, to close the water passage formed in the valve support member, thereby shutting off the communication between the primary side and the secondary side of the city water pipe. Therefore, even if the primary pressure further increases, the secondary pressure is kept at the predetermined level. When the valve seat can make watertight abutment against the inner circumferential portion or the outer circumferential portion of the open end of the valve body and also can make an abutment against the end face of the open end of the valve body, the abutment of the open end of the valve body against the valve seat reliably shuts off the communication between the primary side and the secondary side of the city water pipe and reliably keeps the secondary pressure at a predetermined level.

In a preferred embodiment of the present invention, the pressure reducing valve further comprises a valve stopper assembled with the valve support member as a unitary body to restrict the movement of the valve body.

The valve stopper prevents the valve body from leaving the valve support member. When the valve stopper is assembled with the valve support member as a unitary body, the valve stopper need not be fitted in the city water pipe independently any more. Thus, the setting operation of the pressure reducing valve in the city water pipe becomes easy.

In a preferred embodiment of the present invention, the valve stopper is provided with a cup-shaped body fitting in or fitting on the valve body to slide relatively to the valve body. A pressure sensitive chamber is formed between the closed end of the cup-shaped body and the closed end of the valve body.

Water in the secondary side city water pipe flows into the pressure sensitive chamber through the sliding contact part between the cup-shaped body and the valve body to apply force on the closed end of the valve body. Even if the secondary pressure increases rapidly due to closure of a closing valve disposed in the secondary side city water pipe, the pressure in the pressure sensitive chamber does not increase rapidly due to pressure loss cause by the sliding contact part, the force applied on the closed end of the valve body by the pressure in the pressure sensitive chamber does not increase rapidly, and the water passage formed in the valve support member does not close rapidly. Therefore, water hammer does not occur in the primary side city water pipe when the closing valve disposed in the secondary side city water pipe closes.

When the cup-shaped body of the valve stopper fits on the valve body to slide relatively to the valve body, the volume of the pressure sensitive chamber becomes larger and the ratio of the volume of the pressure sensitive chamber to the flow rate of the water passing through the sliding contact part (volume of the pressure sensitive chamber/flow rate of the water passing through the sliding contact part) becomes larger than those when the cup-shaped body of the valve stopper fits in the valve body to slide. Thus, speed of the pressure increase in the pressure sensitive chamber decreases, speed of the increase of force applied on the closed end of the valve body by the pressure in the pressure sensitive chamber decreases, and the closing speed of the water passage formed in the valve support member decreases. Therefore, water hammer is effectively prevented in the primary side city water pipe when the closing valve disposed in the secondary side city water pipe closes.

When the cup-shaped body of the valve stopper fits in the valve body to slide relatively to the valve body, the end of the sliding contact part between the cup-shaped body and the valve body is not directed toward the primary side. Therefore, the water imparted with dynamic pressure and flowing from the primary side to the secondary side hardly flows in the pressure sensitive chamber through the sliding contact part. Thus, the open end of the valve body is kept from approaching the valve seat due to the increase of the pressure in the pressure sensitive chamber, and the flow rate of the water is kept from decreasing when the water is supplied from the primary side to the secondary side.

In a preferred embodiment of the present invention, the valve stopper fits on the valve body to slide relatively to the valve body and the diameter of the portion of the valve body fitting in the valve stopper is smaller than that of the remaining portion of the valve body.

When the valve stopper fits on the valve body to slide relatively to the valve body, and the diameter of the portion of the valve body fitting in the valve stopper is smaller than that of the other portion of the valve body, the end of the sliding contact part between the cup-shaped body of the valve stopper and the valve body is not directed toward the primary side. Therefore, the water imparted with dynamic pressure and flowing from the primary side to the secondary side hardly flows in the pressure sensitive chamber through the sliding contact part. Thus, the open end of the valve body is kept from approaching the valve seat due to the increase of the pressure in the pressure sensitive chamber, and the flow rate of the water is kept from decreasing when the water is supplied from the primary side to the secondary side.

In a preferred embodiment of the present invention, a ring provided with a slit is disposed in the sliding contact part between the valve stopper and the valve body.

When a ring provided with a slit is disposed in the sliding contact part between the valve stopper and the valve body to allow the water in the secondary side city water pipe to flow into the pressure sensitive chamber only through the slit, it is possible to reliably decrease the speed of the increase of the pressure in the pressure sensitive chamber, and reliably prevent water hammer from occurring in the primary side city water pipe when a closing valve disposed in the secondary side city water pipe closes, if only the slit is formed highly accurately. Thus, the space between the valve stopper and the valve body at the sliding contact part between them does not need to be formed highly accurately any more. The labor required to form the slit in the ring highly accurately is far less than that required to form the space between the valve stopper and the valve body at the sliding contact part between them highly accurately. Thus, the workability of the pressure reducing valve increases.

In a preferred embodiment of the present invention, a seal member is disposed in the sliding contact part between the valve stopper and the valve body and a small hole is formed in the portion of the valve stopper opposite the closed end of the valve body.

Even if the space between the valve stopper and the valve body at the sliding contact part between them is hard to form highly accurately, it is possible to reliably decrease the speed of the increase of the pressure in the pressure sensitive chamber, and reliably prevent water hammer from occurring in the primary side city water pipe when a closing valve disposed in the secondary side city water pipe closes, if only the small hole is formed highly accurately.

BEST MODE FOR CARRYING OUT THE INVENTION

Figure 1:
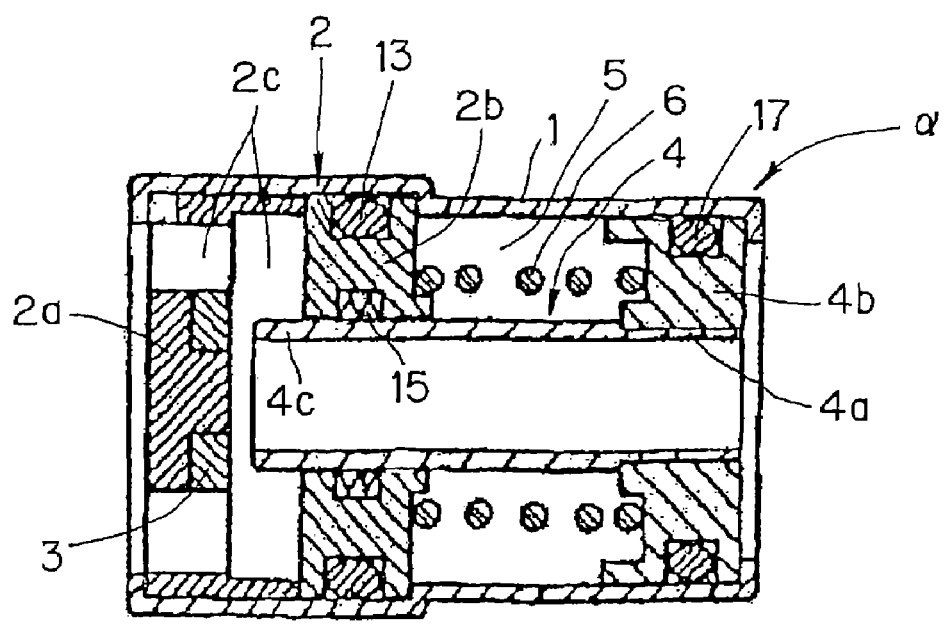
FIG. 1 is a sectional view of a conventional pressure reducing valve in the open condition.
Figure 2:
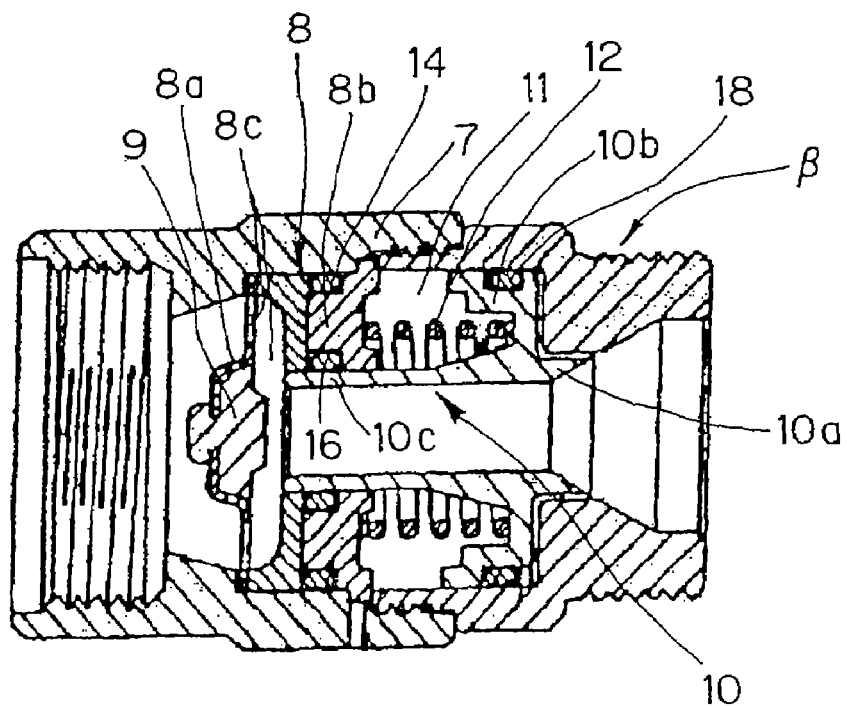
FIG. 2 is a sectional view of a conventional pressure reducing valve in the open condition.
Figure 3:
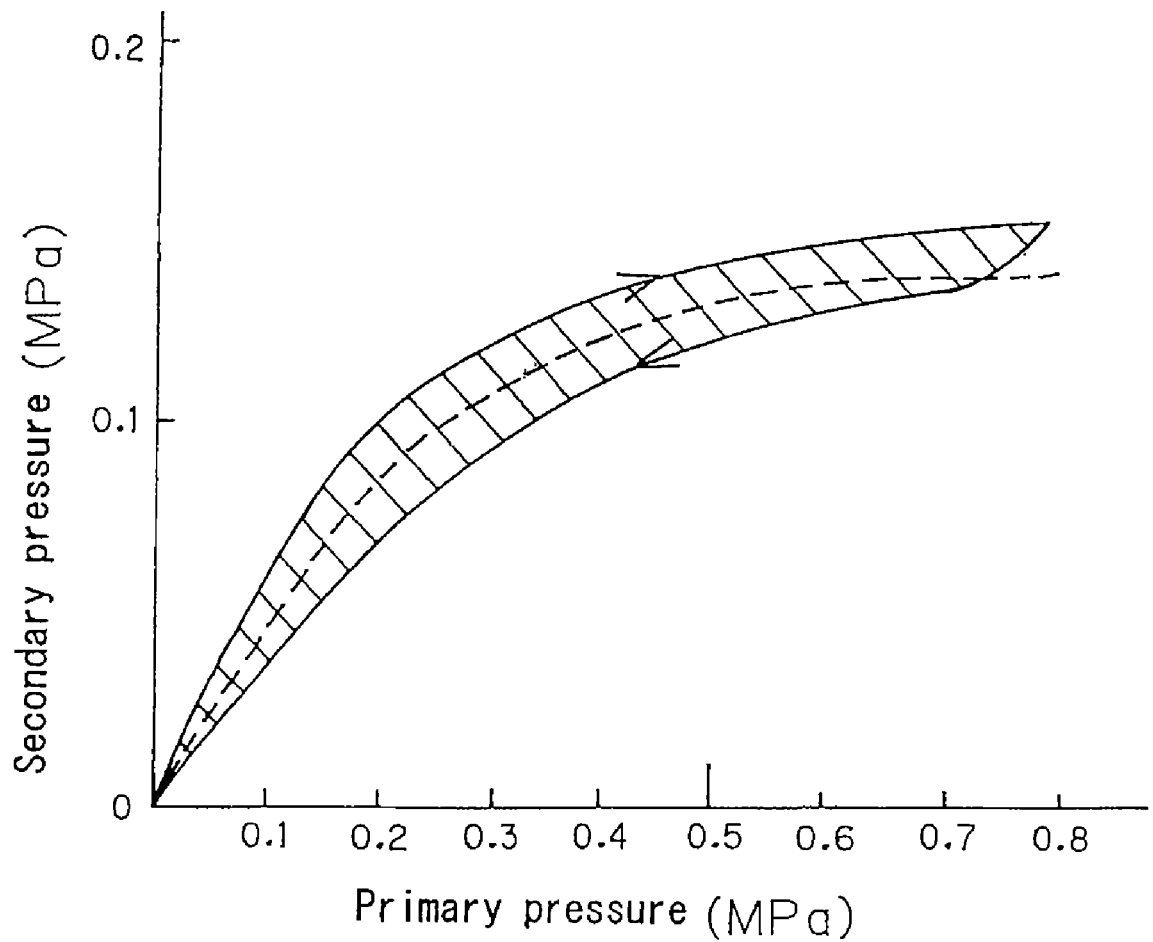
FIG. 3 is a correlation diagram between the primary pressure and the secondary pressure in a conventional pressure reducing valve.
Figure 4:
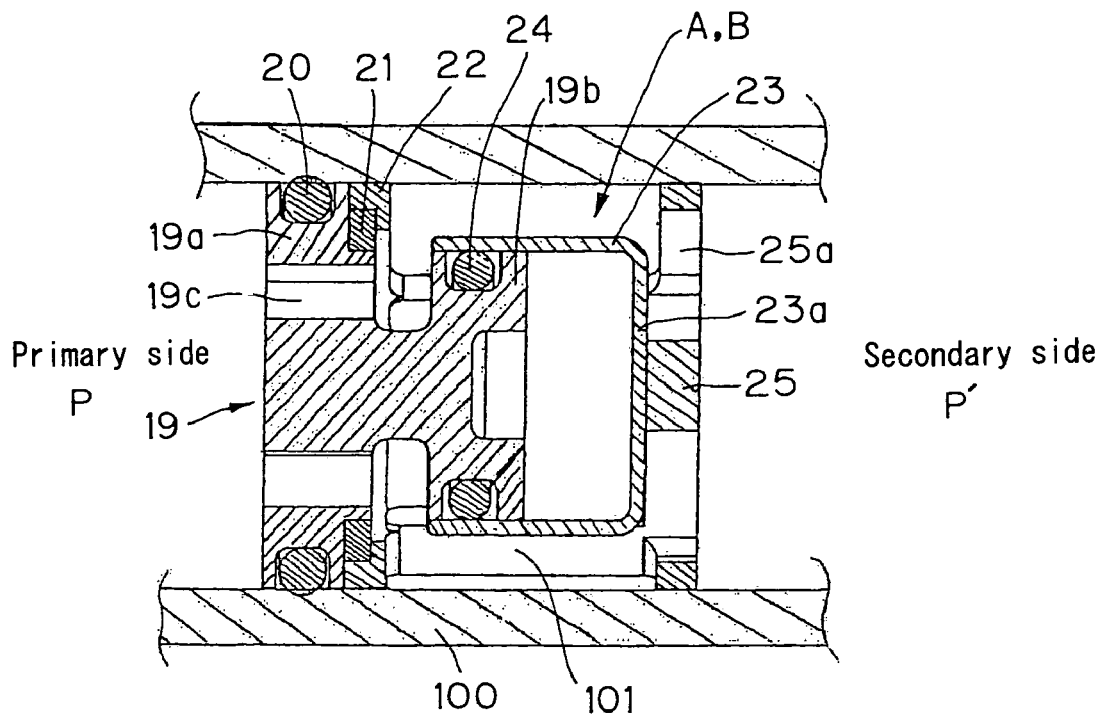
FIG. 4 is a sectional view of a pressure reducing valve in the open condition in accordance with the first and the second preferred embodiments of the present invention.
Figure 5:
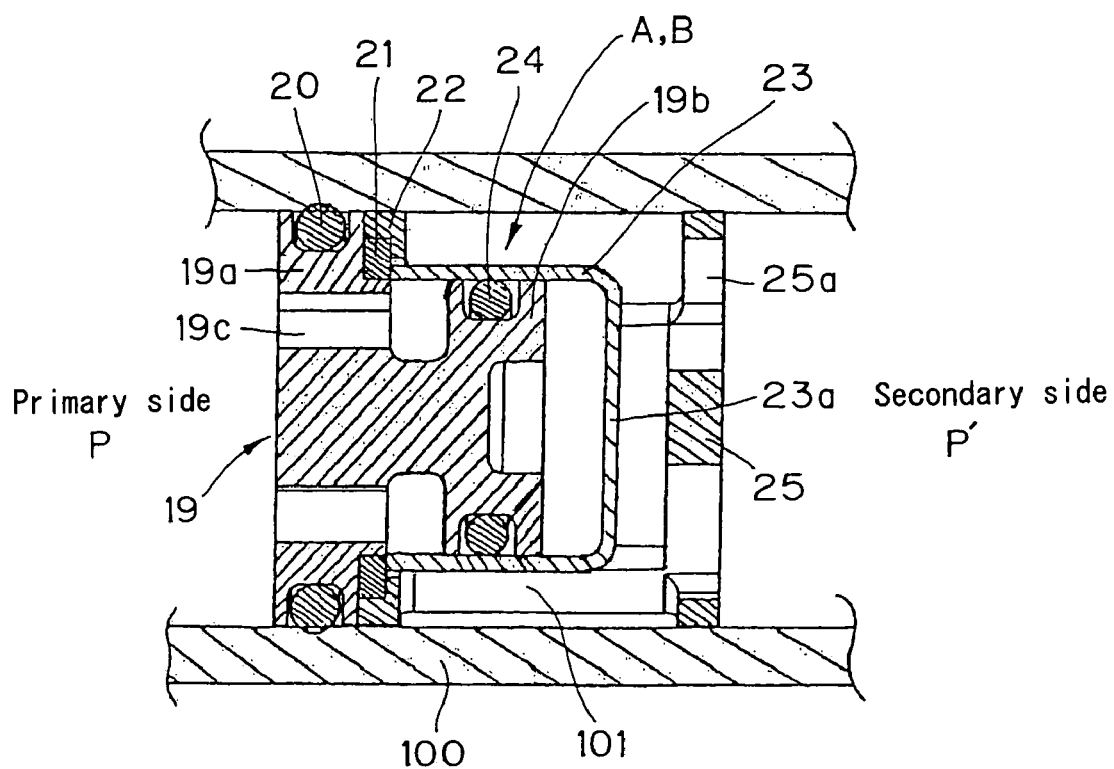
FIG. 5 is a sectional view of a pressure reducing valve in the closed condition in accordance with the first and the second preferred embodiments of the present invention.

The first preferred embodiment of the present invention will be described. As shown in FIG. 4, a pressure reducing valve A is provided with a valve support member 19 comprising a large disk 19a and a small disk 19b formed in a unitary body. The valve support member 19 is provided with water passages 19c extending from the end face of the large disk 19a distanced from the small disk 19b to the circumferential surface of the base portion of the small disk 19b. The large disk 19a is provided with an annular seal member 20 fitting in a circumferential groove formed on the circumferential surface of the large disk 19a. The small disk 19b is provided with an annular valve seat 21 fitting on the base. An annular member 22 tightly fits on the valve seat 21. A cup-shaped valve body 23 fits on the small disk 19b to slide axially. The sliding contact part between the small disk 19b and the valve body 23 is sealed airtight by an annular seal member 24 fitting in a circumferential groove formed on the circumferential surface of the small disk 19b. Mass of air is contained in the valve body 23 as a resilient member for applying resilient force to the valve body 23. A disk-shaped valve stopper 25 is disposed adjacent the closed end of the valve body 23. The valve stopper 25 is provided with water passages 25a. The valve stopper 25 and the annular member 22 are united in a unitary body by pillars not shown in FIGS. and assembled with the valve support member 19 as a unitary body by engaging members not shown in Figures.

The seal members 20, 24 and the valve seat 21 are fitted on the valve support member 19, the valve body 23 is fitted on the small disk 19b at room temperature (about 25° C.), and the annular member 22 and the valve stopper 25 are fitted on the valve support member 19. The aforementioned members are assembled in a unitary body in this manner to form the pressure reducing valve A.

The pressure reducing valve A is fitted in a city water pipe 100 with the end face of the large disk 19a distanced from the small disk 19b directed to the primary side. The secondary side of the contact part between the city water pipe 100 and the large disk 19a is sealed by the seal member 20 to be watertight against the primary side of the contact part between the city water pipe and the large disk 19a.

In the pressure reducing valve A, city water flows from the primary side to the secondary side through the water passages 19c formed in the valve support member 19, an annular water passage 101 formed between the city water pipe 100 and the circumferential wall of the valve body 23, and the water passages 25a formed in the valve stopper 25. When the secondary pressure P' increases according to the increase of the primary pressure P, the valve body 23 moves to a position where the force applied to the closed end 23a of the valve body 23 by the secondary pressure P' balances with the force applied to the closed end 23a of valve body 23 by the mass of air contained in the valve body 23, the open end of the valve body 23 approaches the valve seat 21 to partially cover the secondary side ends of the water passages 19c located on the circumferential surface of the base portion of the small disk 19b, thereby reducing the sectional area of the secondary side ends of the water passages 19c. As a result, the pressure loss in the water passages 19c increases to reduce the secondary pressure P', thereby making the secondary pressure P' approach a predetermined level. When the primary pressure P further increases, the end face of the open end of the valve body 23 abuts the valve seat 21, while the cylindrical portion of the valve body 23 covers the secondary side end of the water passages 19c, to close the water passages 19c, thereby shutting off the water flow from the primary side to the secondary side. Thus, the secondary pressure P' is kept at the predetermined level.

In the pressure reducing valve A, the seal member 24 disposed at the sliding contact part between the small disk 19b and the valve body 23 can alone seal the space receiving the mass of air functioning as a resilient member for forcing the valve body 23. Therefore, the production cost of the pressure reducing valve A is low due to small number of seal members.

In the pressure reducing valve A, generation of hysteresis in the correlation diagram between the primary pressure P and the secondary pressure P' is restrained because the number of the seal members for sealing the space receiving the mass of air functioning as a resilient member for forcing the valve body 23 is small, the diameter of the seal member is small and the area of the sliding contact part between the seal member and the valve body 23 is small, and therefore, resistance force against the approaching slide movement and the leaving slide movement of the valve body 23 relative to the valve seat 21 is small. As a result, precise control of the secondary pressure P' becomes possible.

In the pressure reducing valve A, the radial size of the valve is small and the valve is downsized because the space for receiving the mass of air functioning as a resilient member for forcing the valve body 23 is formed in the valve body 23. Therefore, the pressure reducing valve A can be easily fitted in the city water pipe 100. The pressure reducing valve A can be easily fitted in the city water pipe 100 because it is unitized. Even if the pressure reducing valve A is downsized, the required flow rate can be maintained because the annual water passage 101 is formed radially outside the pressure reducing valve A.

It is not necessary to provide a spring because the mass of air is contained in the valve body 23 as a resilient member. Thus, the number of the members of the valve decreases and the assembling work of the pressure reducing valve A becomes easy. A spring may be provided in addition to the mass of air.

The volume of the internal space of the valve body 23, the air temperature and the air pressure when the valve body 23 is fitted on the small disk 19b, etc. may be suitably controlled to control the force by the resilient member during the operation of the pressure reducing valve A, thereby controlling the aforementioned predetermined level of the secondary pressure P'. It is possible to fill the valve body 23 with air and also dispose a spring in the valve body 23 to raise the aforementioned predetermined level of the secondary pressure P'.

The valve stopper 25 prevents the valve body 23 from leaving the valve support member 19. When the valve stopper 25 is assembled with the valve support member 19 as a unitary body, the valve stopper 25 need not be fitted in the city water pipe 100 independently any more. Thus, the fitting operation of the pressure reducing valve A in the city water pipe 100 becomes easy.

The second preferred embodiment of the present invention will be described. A pressure reducing valve B is provided with mass of inert gas instead of the mass of air as the resilient member for forcing the valve body 23. Except for this feature, the pressure reducing valve B has the same structure as the pressure reducing valve A. The mass of inert gas can work as a resilient member for a long time because it does not dissolve in the city water. Inert gas protects the valve support member 19 and the valve body 23 against corrosion.

Figure 6:
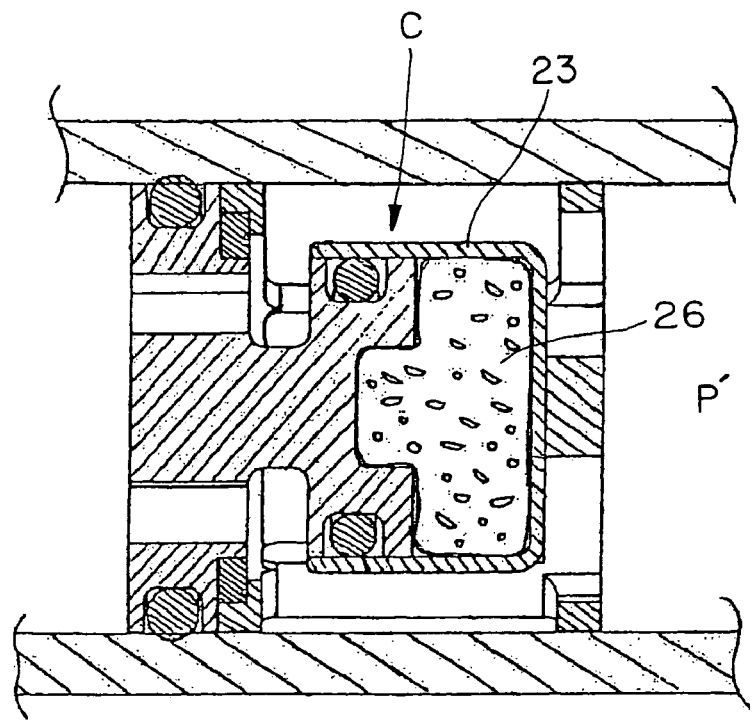
FIG. 6 is a sectional view of a pressure reducing valve in the open condition in accordance with the third preferred embodiment of the present invention.

The third preferred embodiment of the present invention will be described. As shown in FIG. 6, a pressure reducing valve C is provided with a compressible member 26 made of resin foam containing independent bubbles and charged into the valve body 23 as the resilient member for forcing the valve body 23. The compressible member 26 excludes the air from the valve body 23. Except for the feature that the compressible member 26 is charged into the valve body 23 instead of the mass of air, the pressure reducing valve C has the same structure as the pressure reducing valve A.

When the compressible member 26 charged into the valve body 23 is used as the resilient member, the influence of the temperature of the water passing through the valve on the force by the resilient member becomes less and the control of the secondary pressure P' becomes more precise than those when mass of gas contained in the valve body 23 is used as the resilient member. The compressible member 26 can work as a resilient member for a long time because it does not dissolve in the city water. The elasticity characteristic of the compressible member 26 may be controlled to control the aforementioned predetermined level of the secondary pressure P'.

Figure 7:
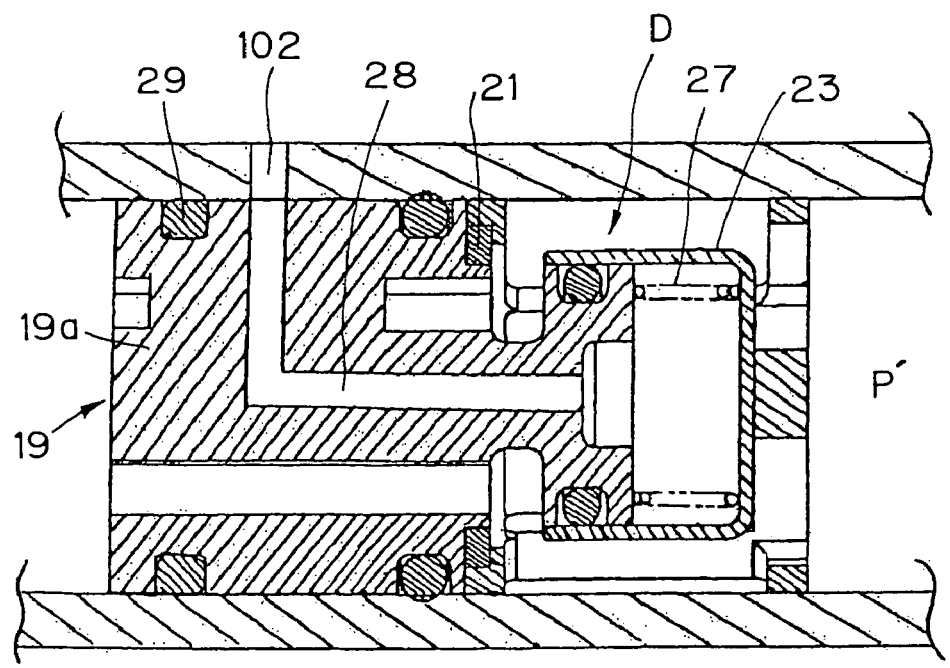
FIG. 7 is a sectional view of a pressure reducing valve in the open condition in accordance with the fourth preferred embodiment of the present invention.

The fourth preferred embodiment of the present invention will be described. As shown in FIG. 7, a pressure reducing valve D is provided with a spring 27 disposed in the valve body 23 as the resilient member for forcing the valve body 23. A passage 28 for communicating the internal space of the valve body 23 with the atmosphere is formed in the valve support member 19. A through hole 102 communicating with the passage 28 is formed in the circumferential wall of the city water pipe 100. The large disk 19a is elongated to facilitate the formation of the passage 28. An additional seal member 29 is disposed in the contact part between the large disk 19a and the city water pipe 100 to prevent the passage 28 from water immersion. Except for he aforementioned features, the pressure reducing valve D has the same structure as the pressure reducing valve A.

The spring 27 is suitable as the resilient member for forcing the valve body 23. When the internal space of the valve body 23 is communicated with the atmosphere, the spring 27 alone applies a force to the valve body 23 to move it away from the valve seat 21. Therefore, influence of the temperature of the water passing through the valve upon the force moving the valve body 23 away from the valve seat 21 decreases, and the control of the secondary pressure P' becomes precise. The elasticity characteristic of the spring 27 may be controlled to control the aforementioned predetermined level of the secondary pressure P'.

Figure 8:
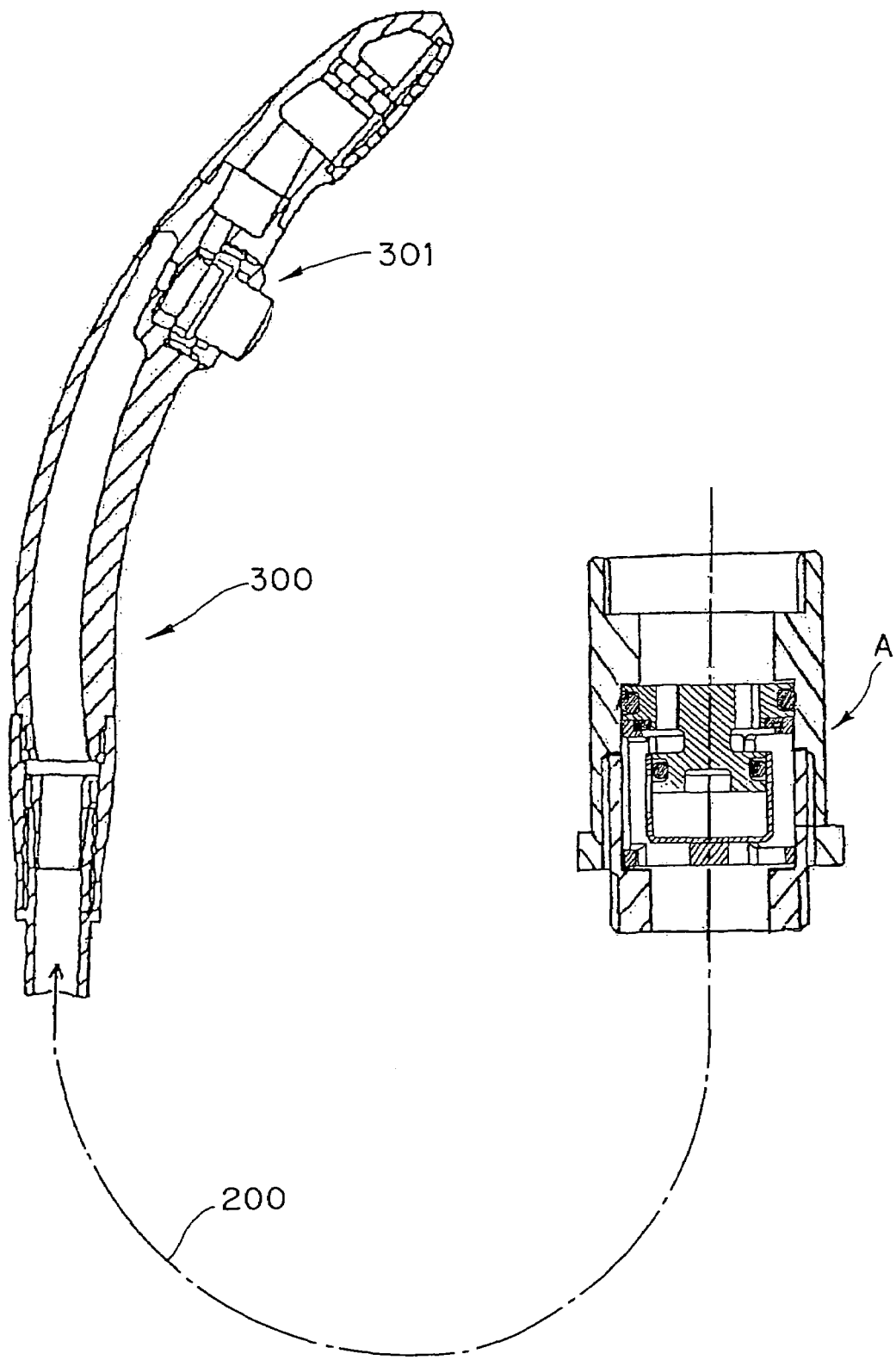
FIG. 8 is a sectional view of a shower apparatus provided with the pressure reducing valve in accordance with the first preferred embodiment of the present invention.

A shower apparatus 300 provided with the pressure reducing valve A at the base portion of a shower hose 200 is shown in FIG. 8. In the shower apparatus 300, the pressure reducing valve A is clamped by a step formed in the primary side water pipe and a step formed in the secondary side water pipe to be fixed to the water pipes. The pressure reducing valve A can be easily fitted in the end portion of the shower hose 200. The pressure reducing valve A can reliably control the secondary pressure P' because the hysteresis in the correlation diagram between the primary pressure and the secondary pressure is small. Therefore, the shower hose 200 is not exposed to excessive water pressure. When a closing valve 302 capable of quick switching operation is provided for the showerhead 301, the aforementioned effect of the pressure reducing valve A is markedly exhibited. Anyone of the pressure reducing valves B to D may be used instead of the pressure reducing valves A.

The pressure reducing valves A to D shown in FIGS. 4 to 7 are fixed to the city water pipes 100 in the same manner as the pressure reducing valves A shown in FIG. 8.

Figure 9:
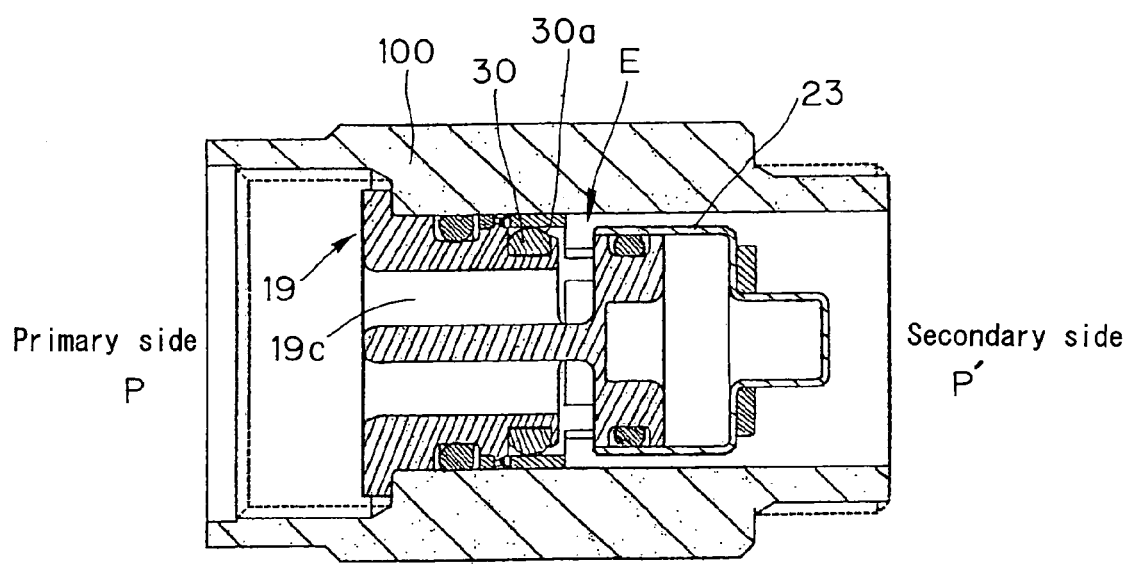
FIG. 9 is a sectional view of a pressure reducing valve in the open condition in accordance with the fifth preferred embodiment of the present invention.

The fifth preferred embodiment of the present invention will be described. As shown in FIGS. 9, 10(a) and 10(b), a pressure reducing valve E is provided with a valve seat 30 having a convex seat surface 30a instead of the valve seat 21. The convex seat surface 30a of the valve seat 30 can make watertight abutment against the inner circumferential portion of the open end of the valve body 23. Except for the feature that the valve seat 30 is disposed instead of the valve seat 21, the pressure reducing valve E has the same structure as the pressure reducing valve A. The pressure reducing valve E is fitted in a casing forming the city water pipe 100. The casing is connected to another city water pipe to form a part of the city water pipe.

When the secondary pressure P' reaches a predetermined level due to the increase of the primary pressure P, the inner circumferential portion of the open end of the valve body 23 abuts the convex seat surface 30a of the valve seat 30, while the cylindrical portion of the valve body 23 covers the secondary side end of the water passages 19c formed in the valve support member 19, to close the water passages 19c, thereby shutting off the communication between the primary side and the secondary side of the city water pipe 100. Thus, the secondary pressure P' is kept at the predetermined level even if the primary pressure P further increases. When the convex seat surface 30a of the valve seat 30 abuts the inner circumferential portion of the open end of the valve body 23, the valve body 23 can keep moving, while maintaining the shutoff of the communication between the primary side and the secondary side of the city water pipe, the volume of the internal space of the secondary side portion of the city water pipe 100 keeps increasing, and the pressure in the secondary side portion of the city water pipe 100 keeps decreasing, even after the communication between the primary side portion and the secondary side portion of the city water pipe 100 is shut off. Therefore, the level of the secondary pressure P' can become lower than that at the instant of the communication between the primary side portion and the secondary side portion of the city water pipe 100 being shut off.

If the convex seat surface 30a of the valve seat 30 abuts the inner circumferential portion of the open end of the valve body 23, the primary pressure is no more applied on the end face 23b of the open end of the valve body 23 the instant that the communication between the primary side and the secondary side of the city water pipe 100 is shut off. Thus, the secondary pressure P' for maintaining the shutoff of the communication can be reduced. Therefore, stress working on the secondary side city water pipe decreases, degree of freedom in the selection of material for the secondary side city water pipe increases, and degree of freedom in the selection of equipment connected to the secondary side city water pipe increases.

When the secondary pressure P' increases due to the closure of the closing valve fitted on the secondary side city water pipe, the valve body 23 keeps moving due to the application of the secondary pressure P' even after the communication between the primary side and the secondary side of the city water pipe 100 is shut off. Thus, the volume of the internal space of the secondary side of the city water pipe increases, and the level of the secondary pressure becomes lower than that at the instant of the communication between the primary side and the secondary side of the city water pipe being shut off. As a result, the stress working on the secondary side city water pipe decreases.

Figure 10:
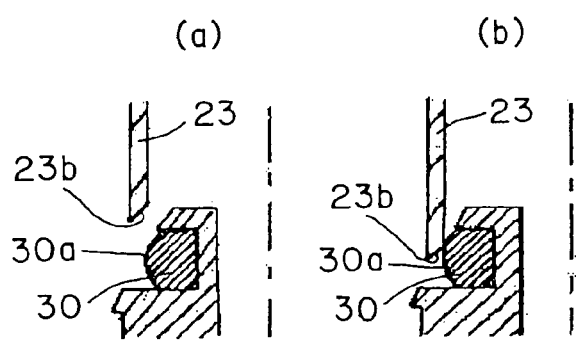
FIG. 10 is a fragmentary sectional view of the pressure reducing valve in the course of closing and in the closed condition in accordance with the fifth preferred embodiment of the present invention.

The inner circumferential portion of the open end of the valve body 23 is desirably chamfered as shown in FIG. 10 to protect the convex seat surface 30a of the valve seat 30 against damage.

Figure 11:
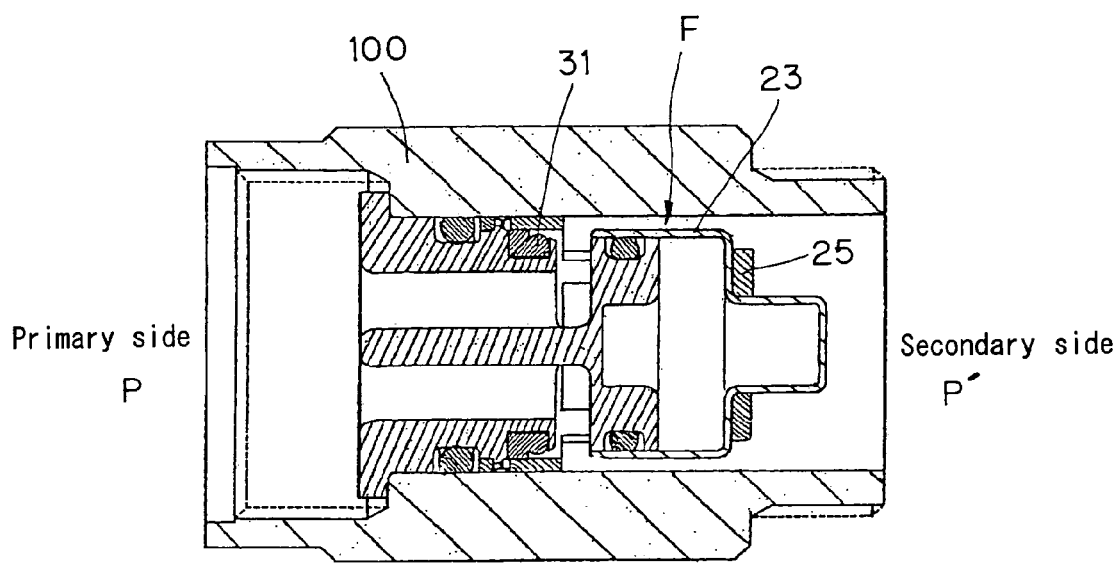
FIG. 11 is a sectional view of a pressure reducing valve in the open condition in accordance with the sixth preferred embodiment of the present invention.
Figure 12:
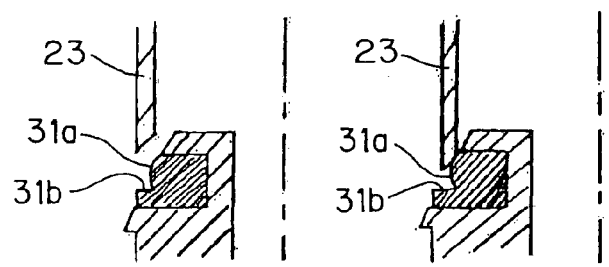
FIG. 12 is a fragmentary sectional view of the pressure reducing valve in the course of closing and in the closed condition in accordance with the sixth preferred embodiment of the present invention.

The sixth preferred embodiment of the present invention will be described. As shown in FIGS. 11, 12(a) and 12(b), a pressure reducing valve F is provided with a valve seat 31 having a convex seat surface 31a and a flat seat surface 31b instead of the valve seat 21. The convex seat surface 31a of the valve seat 31 can make watertight abutment against the inner circumferential portion of the open end of the valve body 23 and the flat seat surface 31b can make watertight abutment against the end face of the open end of the valve body 23. Except for the feature that the valve seat 31 is disposed instead of the valve seat 21, the pressure reducing valve F has the same structure as the pressure reducing valve A. The pressure reducing valve F is fitted in a casing forming the city water pipe 100. The casing is connected to another city water pipe to form a part of the city water pipe.

When the open end of the valve body 23 abuts the valve seat 31, the communication between the primary side and the secondary side of the city water pipe 100 is reliably shut off and the secondary pressure P' is reliably kept at a predetermined level because the valve seat 31 can make watertight abutment against the inner circumferential portion of the open end of the valve body 23 and the end face of the open end of the valve body 23. Even if the sealing function of the convex seat surface 31a decreases due to deterioration, the flat seat surface 31b can shut off the communication between the primary side and the secondary side of the city water pipe 100.

Figure 13:
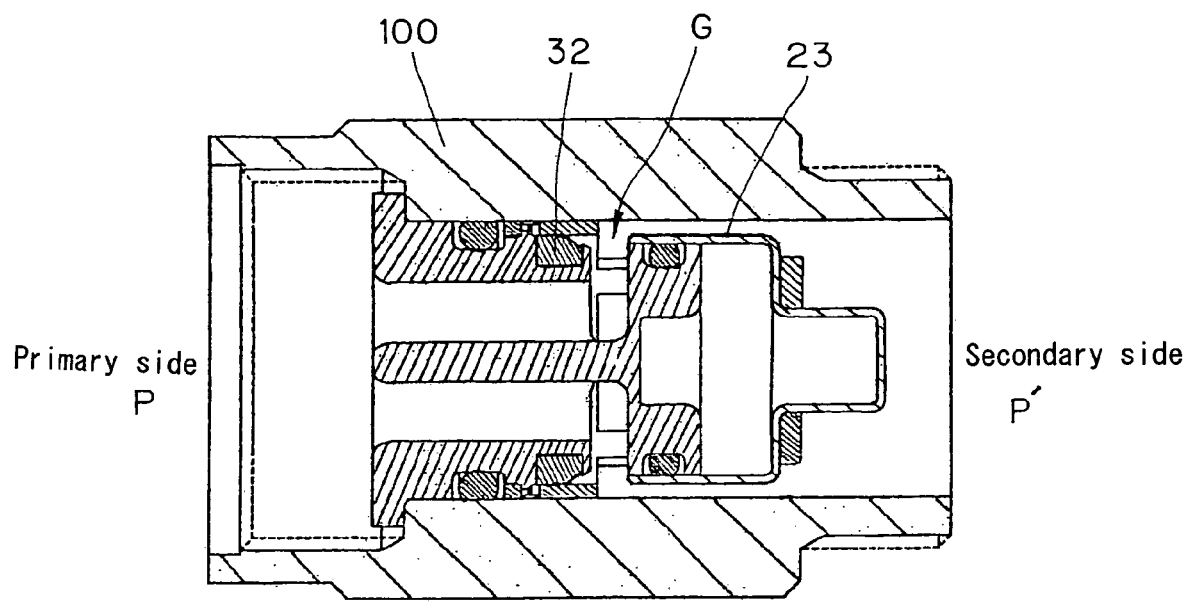
FIG. 13 is a sectional view of a pressure reducing valve in the open condition in accordance with the seventh preferred embodiment of the present invention.

The seventh preferred embodiment of the present invention will be described. As shown in FIGS. 13, 14(a) and 14(b), a pressure reducing valve G is provided with a valve seat 32 capable of making watertight abutment against the inner circumferential portion of the open end of the valve body 23. The portion of the valve seat 32 abutting the open end of the valve body 23 inclines radially outward in the direction away from the open end of the valve body 23. Except for the feature that the valve seat 32 is disposed instead of the valve seat 21, the pressure reducing valve G has the same structure as the pressure reducing valve A. The pressure reducing valve G is fitted in a casing forming the city water pipe 100. The casing is connected to another city water pipe to form a part of the city water pipe.

The inner circumferential edge 23c of the open end of the valve body 23 cuts into the inclined surface 32a of the valve seat 32 when the open end of the valve body 23 abuts the valve seat 32. Therefore, the primary pressure P is reliably kept from applying on the end face 23b of the open end of the valve body 23 when the communication between the primary side and the secondary side of the city water pipe 100 is shut off. Thus, the secondary pressure P' for maintaining the shutoff of the communication can reliably decrease.

Figure 14:
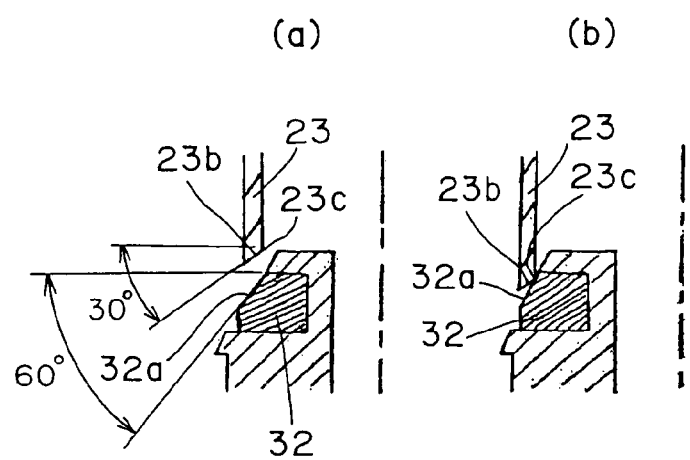
FIG. 14 is a fragmentary sectional view of the pressure reducing valve in the course of closing and in the closed condition in accordance with the seventh preferred embodiment of the present invention.

The inner circumferential portion of the open end of the valve body 23 is desirably chamfered as shown in FIG. 14 to protect the inclined seat surface 32a of the valve seat 32 against damage. The inclination angle of the chamfered part is desirably smaller than the inclination angle of the set surface 32a so that the inner circumferential edge 23c may cut into the inclined seat surface 32a faster than the other part of the open end of the valve body. To be concrete, the inclination angle of the chamfered part of the end face of the valve body 23 is desirably 30° and the inclination angle of the seat surface 32a is desirably 60°.

Figure 15:
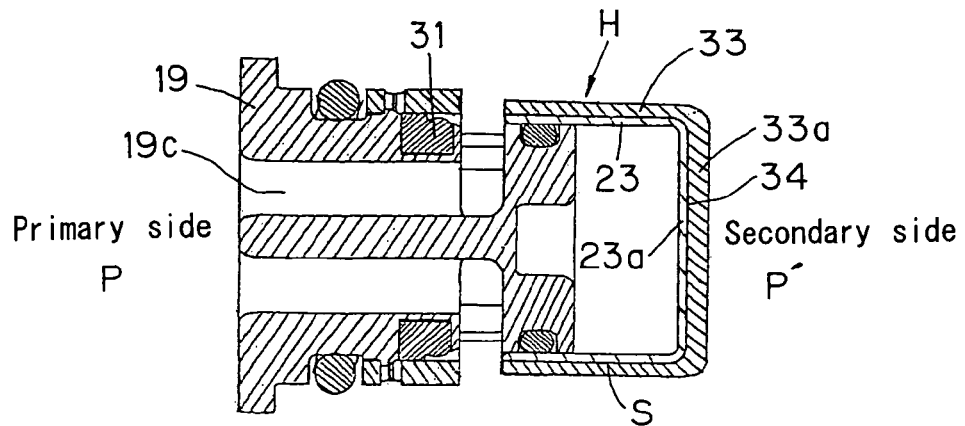
FIG. 15 is a sectional view of a pressure reducing valve in the open condition in accordance with the eighth preferred embodiment of the present invention.
Figure 16:
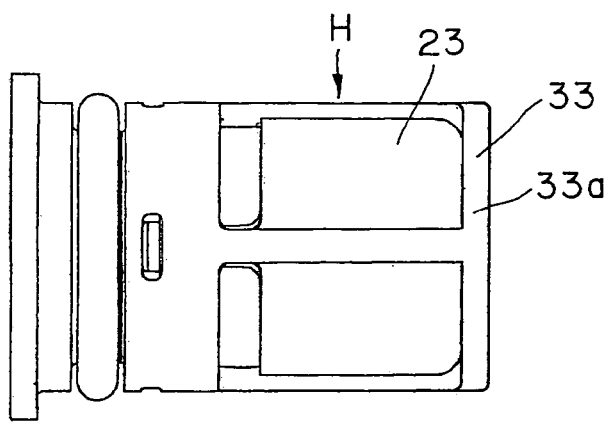
FIG. 16 is a side view of a pressure reducing valve in the open condition in accordance with the eighth preferred embodiment of the present invention.
Figure 17:
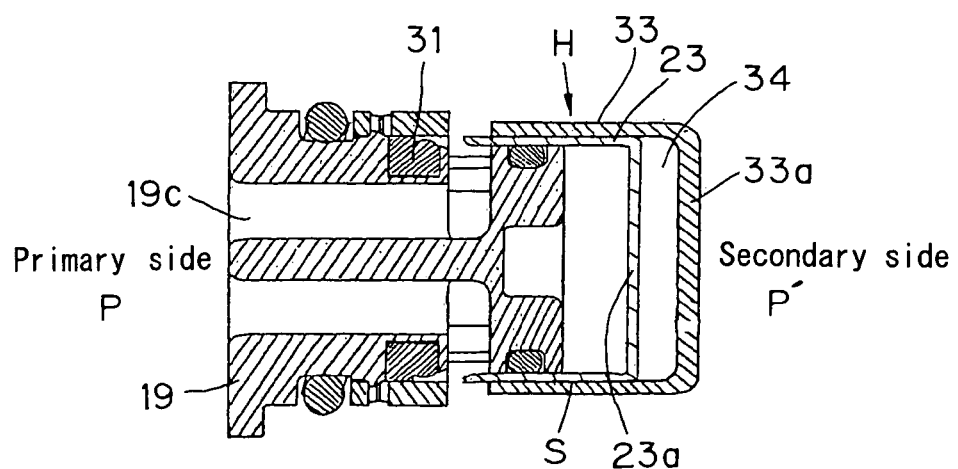
FIG. 17 is a sectional view of the pressure reducing valve in the course of closing in accordance with the eighth preferred embodiment of the present invention.

The eighth preferred embodiment of the present invention will be described. As shown in FIGS. 15 to 17, a pressure reducing valve H is provided with a cup-shaped valve stopper 33 fitting on the valve body 23 to slide relatively to the valve body instead of the valve stopper 25. A pressure sensitive chamber 34 is formed between the closed end 33a of the valve stopper 33 and the closed end 23a of the valve body 23. Except for the feature that the valve stopper 33 is disposed instead of the valve stopper 25, the pressure reducing valve H has the same structure as the pressure reducing valve F. The pressure reducing valve H is fitted in a casing forming the city water pipe. The casing is connected to another city water pipe to form a part of the city water pipe.

In the pressure reducing valve H, water in the secondary side city water pipe flows into the pressure sensitive chamber 34 through the sliding contact part S between the cylindrical portion of the valve stopper 33 and the cylindrical portion of the valve body 23 to apply force on the closed end 23a of the valve body 23. Even if the secondary pressure P' increases rapidly due to closure of a closing valve disposed in the secondary side city water pipe, the pressure in the pressure sensitive chamber 34 does not increase rapidly due to pressure loss cause by the sliding contact part S, the force applied on the closed end 23a of the valve body 23 by the pressure in the pressure sensitive chamber does not increase rapidly, and the water passages 19c formed in the valve support member 19 do not close rapidly. Therefore, water hammer does not occur in the primary side city water pipe when the closing valve disposed in the secondary side city water pipe closes.

The volume of the pressure sensitive chamber 34 is large and ratio of the volume of the pressure sensitive chamber 34 to the flow rate of the water passing through the sliding contact part S (volume of the pressure sensitive chamber 34/flow rate of the water passing through the sliding contact part S) is large because the cylindrical portion of the valve stopper 33 fits on the cylindrical portion of the valve body 23 to slide relatively to the valve body. Thus, speed of the pressure increase in the pressure sensitive chamber is low, speed of the increase of force applied on the closed end 23a of the valve body 23 by the pressure in the pressure sensitive chamber 34 is low, and the closing speed of the water passages 19c formed in the valve support member 19 is low. Therefore, water hammer is effectively prevented in the primary side city water pipe when the closing valve disposed in the secondary side city water pipe closes.

Figure 18:
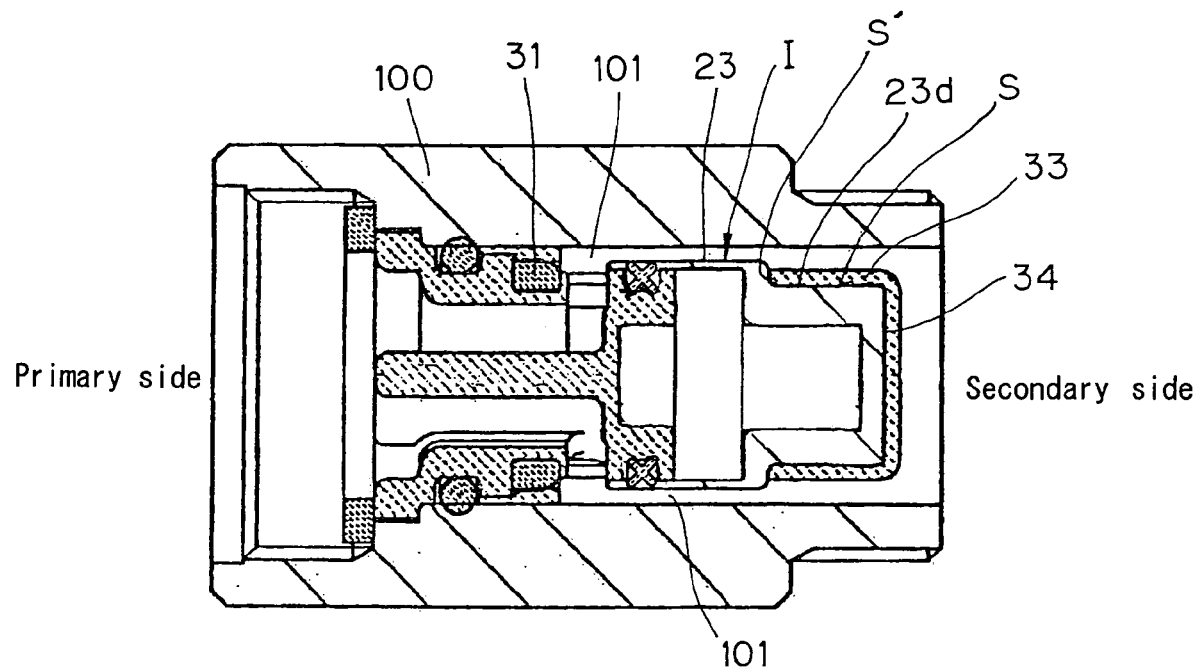
FIG. 18 is a sectional view of a pressure reducing valve in the open condition in accordance with the ninth preferred embodiment of the present invention.

The ninth preferred embodiment of the present invention will be described. As shown in FIG. 18, in a pressure reducing valve I, the diameter of the portion 23d of the valve body 23 fitting in the valve stopper 33 is smaller than that of the other portion of the valve body 23. Except for the aforementioned feature, the pressure reducing valve I has the same structure as the pressure reducing valve H. The pressure reducing valve I is fitted in a casing forming the city water pipe 100. The casing is connected to another city water pipe to form a part of the city water pipe.

The end S' of the sliding contact part S between the cylindrical portion of the valve body 23 and the cylindrical portion of the valve stopper 33 is directed not toward the primary side but radially outward because the diameter of the portion 23d of the valve body 23 fitting in the valve stopper 33 is smaller than that of the other portion of the valve body 23. Therefore, the water imparted with dynamic pressure and flowing from the primary side to the secondary side hardly flows in the pressure sensitive chamber 34 from the water passage 101 through the sliding contact part S. Thus, the open end of the valve body 23 is kept from approaching the valve seat 31 due to the increase of the pressure in the pressure sensitive chamber 34, and the flow rate of the water is kept from decreasing when the water is supplied from the primary side to the secondary side. When the valve body 23 moves from the closed position to the open position, the water in the pressure sensitive chamber 34 discharges into the water passage 101. The water flow discharging from the pressure sensitive chamber 34 into the water passage 101 is not prevented by the water flowing in the water passage 101 from the primary side to the secondary side because the end S' of the sliding contact part S is not directed toward the primary side. Therefore, the closing movement and the opening movement of the valve body 23 are kept smooth.

Figure 19:
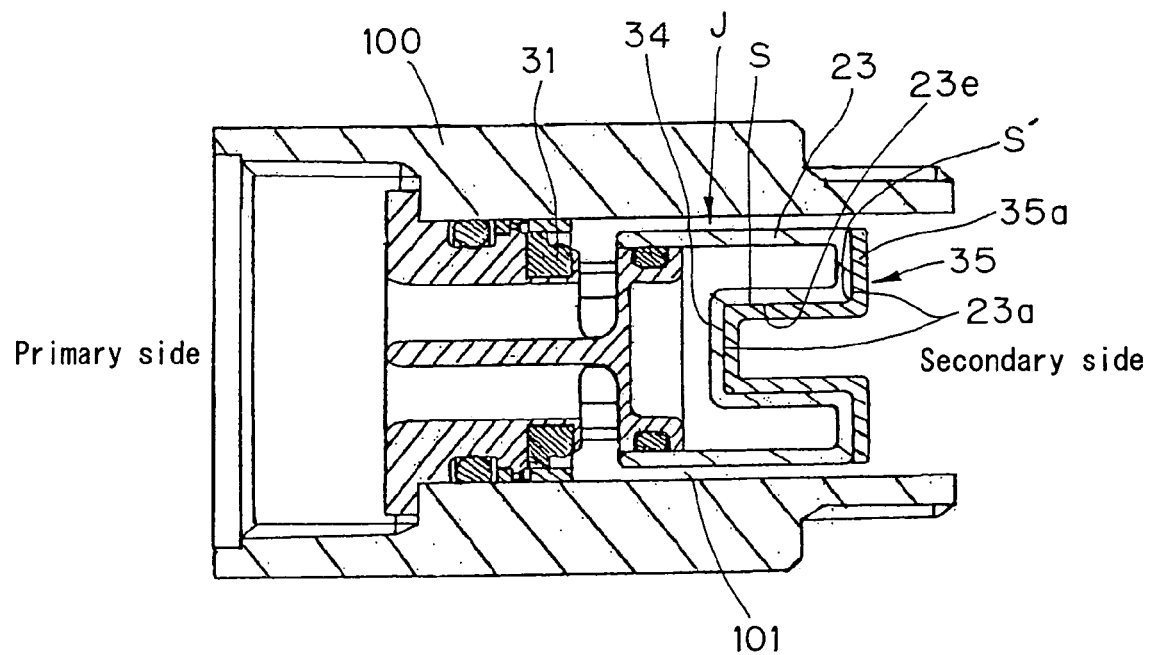
FIG. 19 is a sectional view of a pressure reducing valve in the open condition in accordance with the tenth preferred embodiment of the present invention.

The tenth preferred embodiment of the present invention will be described. As shown in FIG. 19, a pressure reducing valve J is provided with a cup-shaped valve stopper 35 having an outer flange 35a at its open end instead of the valve stopper 33. The cylindrical portion of the valve stopper 35 fits in a concave 23e formed in the closed end 23a of the valve body 23 to slide relatively to the valve body. Except for the aforementioned features, the pressure reducing valve J has the same structure as the pressure reducing valve H. The pressure reducing valve J is fitted in a casing forming the city water pipe 100. The casing is connected to another city water pipe to form a part of the city water pipe.

The end S' of the sliding contact part S between the cylindrical portion of the valve stopper 35 and the concave 23e of the valve body 23 is directed toward the secondary side. Therefore, the water imparted with dynamic pressure and flowing from the primary side to the secondary side hardly flows in the pressure sensitive chamber 34 from the water passage 101 through the sliding contact part S. Thus, the open end of the valve body 23 is kept from approaching the valve seat 31 due to the increase of the pressure in the pressure sensitive chamber 34, and the flow rate of the water is kept from decreasing when the water is supplied from the primary side to the secondary side. When the valve body 23 moves from the closed position to the open position, the water in the pressure sensitive chamber 34 discharges into the water passage 101. The water flow discharging from the pressure sensitive chamber 34 into the water passage 101 is not prevented by the water flowing in the water passage 101 from the primary side to the secondary side because the water flow is not directed toward the primary side. Therefore, the closing movement and the opening movement of the valve body 23 are kept smooth.

Figure 20:
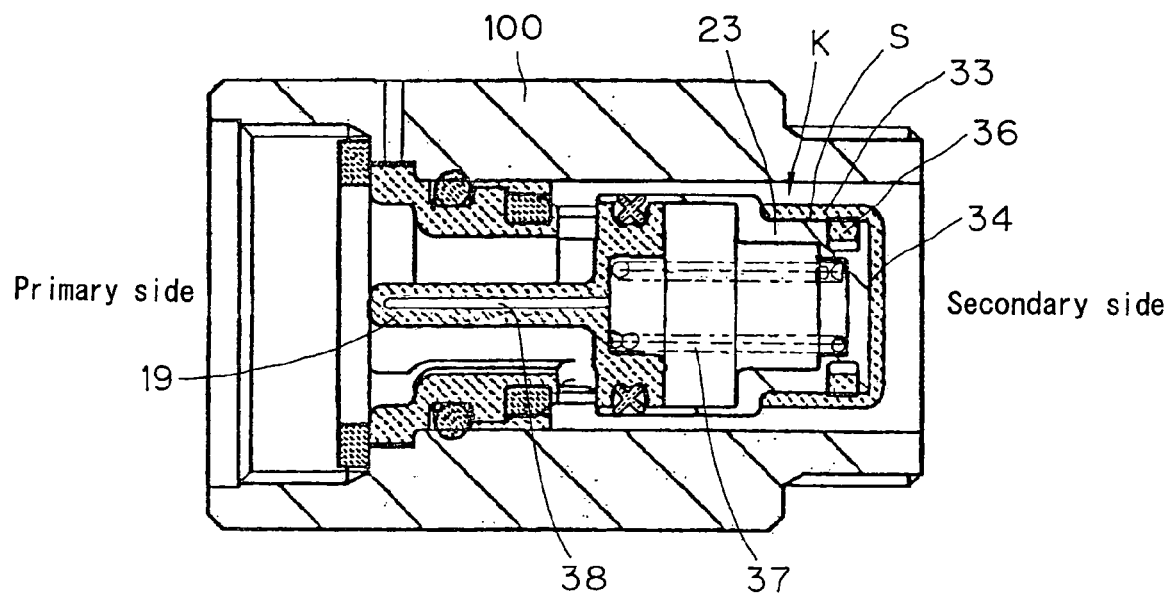
FIG. 20 is a sectional view of a pressure reducing valve in the open condition in accordance with the eleventh preferred embodiment of the present invention.
Figure 21:
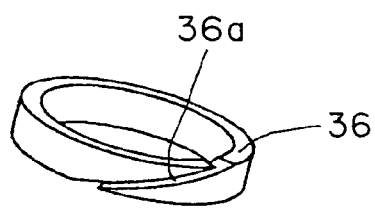
FIG. 21 is a perspective of the ring provided for the pressure reducing valve in accordance with the eleventh preferred embodiment of the present invention.
Figure 22:
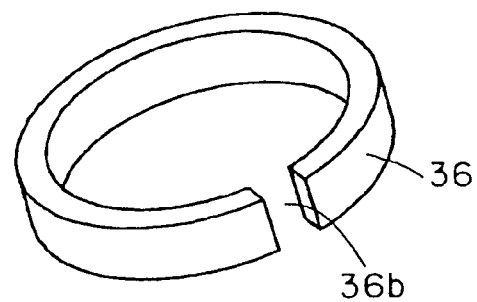
FIG. 22 is a perspective of the ring provided for the pressure reducing valve in accordance with the eleventh preferred embodiment of the present invention.

The eleventh preferred embodiment of the present invention will be described. As shown in FIGS. 20 to 22, a pressure reducing valve K is provided with a ring 36 disposed in the sliding contact part S between the cylindrical portion of the valve stopper 33 and the cylindrical part of the valve body 23. The ring 36 is provided with a slit such as a spiral slit 36a, a straight slit 36b, or the like. The ring 36 fits in a circumferential groove formed on the outer circumferential surface of the cylindrical portion of the valve body 23 and abuts the inner circumferential surface of the cylindrical portion of the valve stopper 33 to slide relative to the valve stopper under its own resilient force. A spring 37 is disposed in the valve body 23 and a passage 38 for communicating the internal space of the valve body 23 with the atmosphere is formed in the valve support member 19. Except for the aforementioned features, the pressure reducing valve K has the same structure as the pressure reducing valve I. The pressure reducing valve K is fitted in a casing forming the city water pipe 100. The casing is connected to another city water pipe to form a part of the city water pipe. The casing is provided with a through hole communicating with the passage 38.

In the pressure reducing valve K, the water in the secondary side city water pipe 100 flows into the pressure sensitive chamber 34 only through the slit 36a or 36b of the ring 36. Therefore, it is possible to reliably decrease the speed of the increase of the pressure in the pressure sensitive chamber 34, and reliably prevent water hammer from occurring in the primary side city water pipe when a closing valve disposed in the secondary side city water pipe closes, if only the slit 36a or 36b of the ring 36 is formed highly accurately. Thus, the space at the sliding contact part S between the cylindrical portion of the valve stopper 33 and the cylindrical portion of the valve body 23 does not need to be formed highly accurately any more. The labor required to form the slit 36a or 36b in the ring 36 highly accurately is far less than that required to form the space at the sliding contact part S between the cylindrical portion of the valve stopper 33 and the cylindrical portion of the valve body 23 highly accurately. Thus, the workability of the pressure reducing valve K increases. The spiral slit 36a forms a water passage longer than that the straight slit 36b forms, causes pressure loss larger than that the straight slit 36b causes, and can realize speed of pressure increase in the pressure-sensitive chamber 34 lower than that the straight slit 36b can realize. The straight slit 36b has the advantage that it can be made easily.

Figure 23:
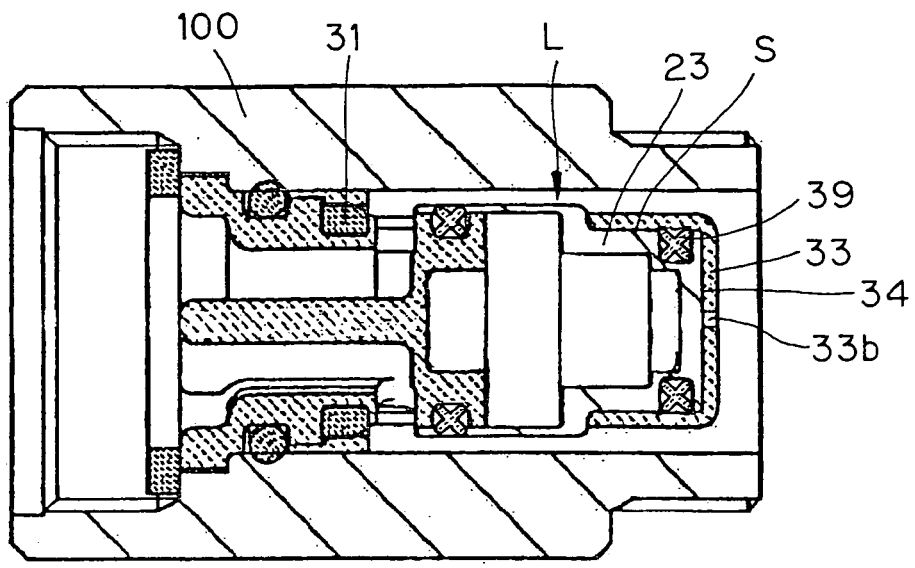
FIG. 23 is a sectional view of a pressure reducing valve in the open condition in accordance with the twelfth preferred embodiment of the present invention.

The twelfth preferred embodiment of the present invention will be described. As shown in FIG. 23, a pressure reducing valve L is provided with an annular seal member 39 in the sliding contact part S between the cylindrical portion of the valve stopper 33 and the cylindrical portion of the valve body 23. The valve stopper 33 is provided with a small through hole 33b at its portion opposite the closed end 23a of the valve body 23. Except for the aforementioned features, the pressure reducing valve L has the same structure as the pressure reducing valve I. The pressure reducing valve L is fitted in a casing forming the city water pipe 100. The casing is connected to another city water pipe to form a part of the city water pipe.

In the pressure reducing valve L, the water in the secondary side city water pipe 100 flows into the pressure sensitive chamber 34 only through the through hole 33b. Therefore, it is possible to reliably decrease the speed of the increase of the pressure in the pressure sensitive chamber 34, and reliably prevent water hammer from occurring in the primary side city water pipe when a closing valve disposed in the secondary side city water pipe closes, if only the through hole 33b is formed highly accurately. Thus, the space at the sliding contact part S between the cylindrical portion of the valve stopper 33 and the cylindrical portion of the valve body 23 does not need to be formed highly accurately any more. The labor required to form the through hole 33b highly accurately is far less than that required to form the space at the sliding contact part S between the cylindrical portion of the valve stopper 33 and the cylindrical portion of the valve body 23 highly accurately. Thus, the workability of the pressure reducing valve L increases. Resistance force against the approaching slide movement and the leaving slide movement of the valve body 23 relative to the valve seat 31 increases due to the disposition of the seal member 39. However the generation of hysteresis in the correlation diagram between the primary pressure and the secondary pressure is restrained as compared with the conventional pressure reducing valve because the diameter of the seal member 39 is small in diameter and the area of the sliding contact surface between the seal member 39 and the valve stopper 33 is small.

In the pressure reducing valves E to L, the inner circumferential portion of the open end of the valve body 23 abuts the valve seat. The outer circumferential portion of the open end of the valve body 23 may abut the valve seat. At the instant of the communication between the primary side and the secondary side of the city water pipe 100 being shut off, the primary pressure works on the end face of the open end of the valve body 23. However, the primary pressure stops to work on the end face of the open end of the valve body as the valve body keeps moving. Except for the aforementioned feature, the present structure can achieve the same effect as that of the structure wherein the inner circumferential portion of the open end of the valve body 23 abuts the valve seat. When the valve body 23 is made of stainless steel, the wall of the cylindrical portion becomes thin, and the primary pressure acting on the end face of the open end of the valve body 23 decreases.

Figure 24:
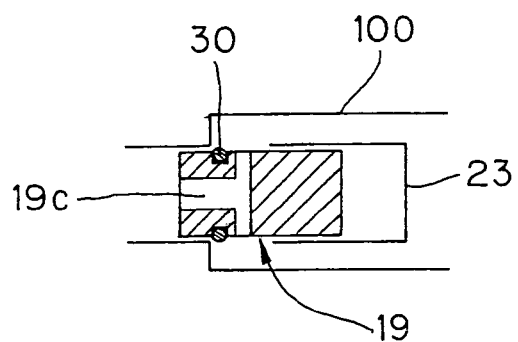
FIG. 24 is a sectional view of a pressure reducing valve in the open condition in accordance with another preferred embodiment of the present invention.

As shown in FIG. 24, the valve support member 19 may be of circular-pillar-shape with constant diameter.

Figure 25:
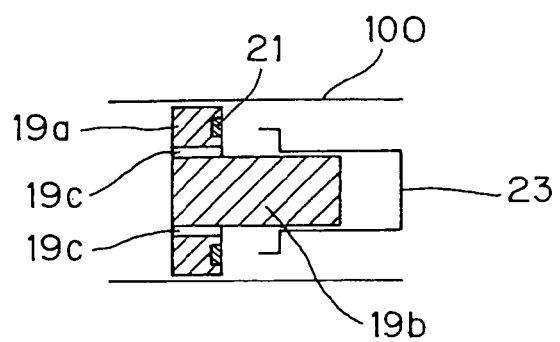
FIG. 25 is a sectional view of a pressure reducing valve in the open condition in accordance with another preferred embodiment of the present invention.

As shown in FIG. 25, the water passages 19c may be formed in the large disk 19a only.

In the pressure reducing valve K, a step-shaped slit may be formed in the ring 36. The water passage formed by the slit becomes longer and the pressure loss increases.

In the pressure reducing valve L, the small through hole 33b may be disposed at the position other than that shown in FIG. 23. It may be disposed anywhere capable of communicating with the pressure sensitive chamber 34 and kept from contacting with the seal member 39.

The valve seats 21, 30, 31 and 32 are desirably made of resilient material such as rubber, or the like. The valve body 23 is desirably made of a high-strength and corrosion-resistant material such as stainless steel, or the like.

In the pressure reducing valves A to D, the end face of the open end of the valve body 23 may be tapered toward the inner circumferential periphery.

The primary pressure stops working on the end face of the open end of the valve body 23 the instant that the communication between the primary side and the secondary side of the city water pipe 100 is shut off because the inner circumferential portion of the end face abuts the valve seat 21 faster than the outer circumferential portion of the end face. Thus, the secondary pressure P' for maintaining the shutoff of the communication can be reduced.

INDUSTRIAL APPLICABILITY OF THE INVENTION

The pressure reducing valve in accordance with the present invention can be used in various apparatuses such as shower apparatuses, hand shower apparatuses used in kitchen, etc.

The invention claimed is:

1. A pressure reducing valve comprising a valve support member provided with a water passage, a valve seat fitting on the portion of the valve support member primary side relative to the secondary side end of the water passage, a cup-shaped valve body fitting on the secondary side end of the valve support member to slide and capable of abutting the valve seat at the open end, while enclosing the secondary side end of the water passage at the cylindrical portion, a seal member for sealing a first sliding contact part between the valve support member and the valve body, a resilient member disposed in the valve body to force the valve body away from the valve seat, and a valve stopper assembled with the valve support member as a unitary body to restrict the movement of the valve body, wherein the valve stopper is provided with a cup-shaped body fitting in or fitting on the valve body to slide relatively to the valve body, and wherein a pressure sensitive chamber is formed between the closed end of the cup-shaped body and the closed end of the valve body.

2. A pressure reducing valve comprising a valve support member provided with a water passage, a valve seat fitting on the portion of the valve support member primary side relative to the secondary side end of the water passage, a cup-shaped valve body fitting on the secondary side end of the valve support member to slide and capable of abutting the valve seat at the open end, while enclosing the secondary side end of the water passage at the cylindrical portion, a seal member for sealing a first sliding contact part between the valve support member and the valve body, a resilient member disposed in the valve body to force the valve body away from the valve seat, and a valve stopper assembled with the valve support member as a unitary body to restrict the movement of the valve body, wherein the valve stopper fits on the valve body to slide relatively to the valve body, and the diameter of the portion of the valve body fitting in the valve stopper is smaller than that of a remaining portion of the valve body.

3. A pressure reducing valve of claim 1, wherein a ring provided with a slit is disposed in a second sliding contact part between the valve stopper and the valve body.

4. A pressure reducing valve of claim 1, wherein a seal member is disposed in a second sliding contact part between the valve stopper and the valve body and a small diameter hole is formed in the portion of the valve stopper kept from contacting the seal member and capable of communicating with the pressure sensitive chamber.

5. A pressure reducing valve of claim 2, wherein a ring provided with a slit is disposed in a second sliding contact part between the valve stopper and the valve body.

6. A pressure reducing valve of claim 2, wherein a seal member is disposed in a second sliding contact part between the valve stopper and the valve body and a small diameter hole is formed in the portion of the valve stopper kept from contacting the seal member and capable of communicating with the pressure sensitive chamber.

* * * * *